(12) United States Patent
Mejia Barajas

(10) Patent No.: US 10,086,777 B2
(45) Date of Patent: Oct. 2, 2018

(54) VEHICLE TRUNK AND TIRE REPLACEMENT MAT

(71) Applicant: Ford Global Technologies, LLC, Dearborn, MI (US)

(72) Inventor: Federico Emilio Mejia Barajas, Huixquilucan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 15/413,920

(22) Filed: Jan. 24, 2017

(65) Prior Publication Data
US 2018/0208129 A1    Jul. 26, 2018

(51) Int. Cl.
*B60R 13/01* (2006.01)
*B60N 3/04* (2006.01)

(52) U.S. Cl.
CPC ............ *B60R 13/011* (2013.01); *B60N 3/044* (2013.01); *B60N 3/048* (2013.01)

(58) Field of Classification Search
CPC ........ B60R 13/011; B60N 3/048; B60N 3/044
USPC .......................... 296/97.23, 1.07, 37.16, 37.2
See application file for complete search history.

(56) References Cited

U.S. PATENT DOCUMENTS

| | | | | |
|---|---|---|---|---|
| 1,372,846 | A * | 3/1921 | Temple | ........................ 280/32.6 |
| 4,766,626 | A | 8/1988 | Green | |
| D385,142 | S | 10/1997 | Sparks | |
| 6,033,003 | A * | 3/2000 | Bell | ........................ B60R 13/01 |
| | | | | 296/37.3 |
| 6,290,278 | B1 * | 9/2001 | Loveland | .................. B60R 5/04 |
| | | | | 296/37.3 |
| 6,467,829 | B2 * | 10/2002 | Kaluszka | ............... B62D 43/10 |
| | | | | 296/37.1 |
| 8,398,164 | B2 * | 3/2013 | Baker | .................. B60N 2/3011 |
| | | | | 297/15 |

(Continued)

FOREIGN PATENT DOCUMENTS

| DE | 3145556 A1 * | 5/1983 | ............. B60Q 7/005 |
|---|---|---|---|
| WO | 2016029271 A1 | 3/2016 | |

OTHER PUBLICATIONS

Bestrestproducts, https://www.bestrestproducts.com/p-35-beadbrakr.aspx, Hard Parts 4 Hard Rides, Dec. 6, 2016.

*Primary Examiner* — Jason S Morrow
*Assistant Examiner* — E Turner Hicks
(74) *Attorney, Agent, or Firm* — Vichit Chea; Brooks Kushman P.C.

(57) ABSTRACT

A vehicle trunk mat may include a first side and a second side. The second side is opposite the first side and includes a first surface having anti-slip characteristics. The vehicle trunk mat is shaped to cover a portion of a trunk cavity lower surface with the first side facing upward and sized for location upon a surface adjacent a vehicle tire mount location to assist in replacing a failed tire. The second side may further include indicia having tire change instructions thereupon. The second side may further include a reflector. The vehicle trunk mat may further include a foldable portion in which an upright configuration positions the reflector upright relative to an underlying surface. The second side may further include a second surface having soft characteristics to support a user thereupon. The second side may further include a receptacle sized to receive one or more wheel nuts.

19 Claims, 3 Drawing Sheets

(56) References Cited

U.S. PATENT DOCUMENTS

| | | | |
|---|---|---|---|
| 8,696,045 B2 * | 4/2014 | Takenaka | B62D 43/10 296/37.2 |
| 8,834,985 B2 * | 9/2014 | Preisler | B32B 3/263 296/39.1 |

* cited by examiner

VEHICLE TRUNK AND TIRE REPLACEMENT MAT

TECHNICAL FIELD

This disclosure relates to a vehicle trunk mat for insertion within a vehicle trunk cavity and removal to assist with changing a failed vehicle tire.

BACKGROUND

A spare tire for a vehicle is commonly stored in a vehicle trunk. Removing the spare tire to replace a failed tire is often a cumbersome task. The weight and bulkiness of the spare tire may make it difficult to remove the spare tire from the trunk and mount the spare tire on the vehicle. A surface adjacent a vehicle mount location may have undesirable characteristics increasing difficulty for a user to remove and replace a failed tire.

SUMMARY

A vehicle trunk mat includes a first side and a second side. The second side includes a receptacle, at least two surfaces, and a foldable portion including a reflector. The first and second sides are shaped to substantially cover a trunk lower surface with the first side for facing upward relative to an underlying surface when positioned upon the trunk lower surface and the second side for facing upward relative to the underlying surface when positioned adjacent a vehicle tire mount location. The receptacle may be sized to receive one or more wheel nuts. The foldable portion may orient the reflector in a substantially horizontal orientation relative to the underlying surface when positioned in a first position and may orient the reflector in a substantially upright orientation relative to the underlying surface when positioned in a second position. The at least two surfaces may include an anti-slip surface and a soft surface. The first side may be of a material selected to minimize debris accumulation thereupon when the second side is facing upward. The first and second sides may define at least one handle aperture.

A vehicle trunk assembly includes a vehicle body and a trunk mat. The vehicle body includes a trunk cavity defining a lower surface. The trunk mat is sized to substantially cover the lower surface and includes a first side of a material selected to minimize debris adhesion and a second side having features to assist a user in replacing a failed tire. The features of the second side may include a receptacle, at least two surfaces, and a foldable portion including a reflector. One of the at least two surfaces may be of an anti-slip material and the other of the at least two surfaces may be of a soft material. The first side may be a super-hydrophobic surface including a non-silica coating. The second side may include an anti-slip surface having portions extending from the second side. The second side further may further include indicia including instructions on failed tire replacement. The trunk mat may include at least one foldable seam so that a portion of the trunk mat folds upward to orient a reflector in a substantially upright position relative to an underlying surface.

A vehicle trunk mat includes a first side and a second side. The second side is opposite the first side and includes a first surface having anti-slip characteristics. The vehicle trunk mat is shaped to cover a portion of a trunk cavity lower surface with the first side facing upward and sized for location upon a surface adjacent a vehicle tire mount location to assist in replacing a failed tire. The second side may further include indicia having tire change instructions thereupon. The second side may further include a reflector. The vehicle trunk mat may further include a foldable portion in which an upright configuration positions the reflector upright relative to an underlying surface. The second side may further include a second surface having soft characteristics to support a user thereupon. The second side may further include a receptacle sized to receive one or more wheel nuts. The first side may be of a material to minimize debris adhesion thereto.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
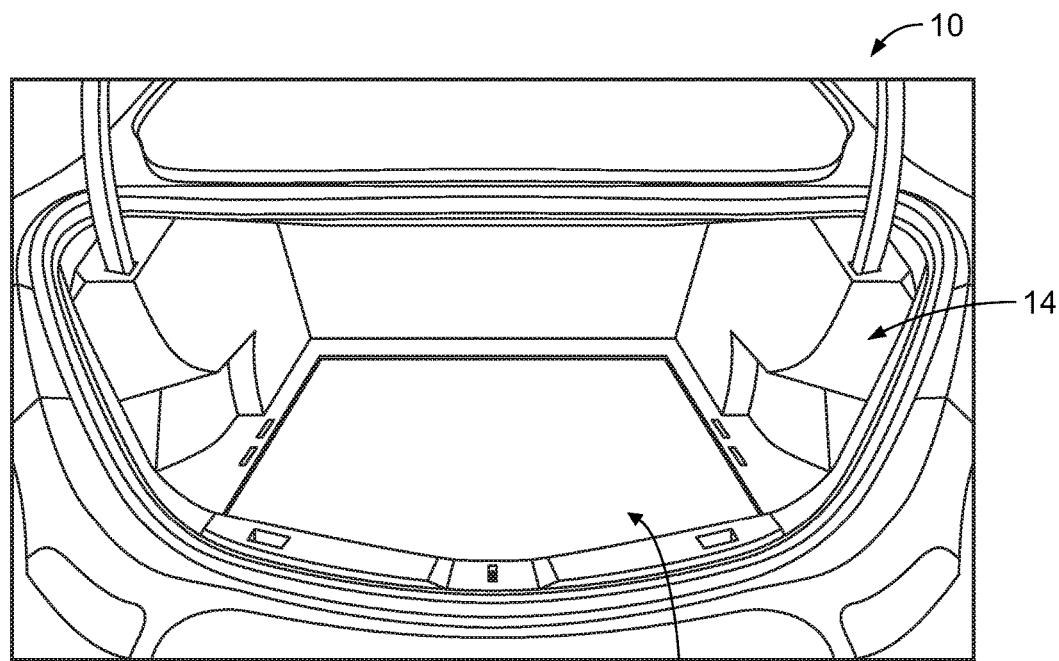
FIG. 1 is a fragmentary rear perspective view of a portion of an example of a vehicle showing a vehicle trunk cavity including an example of a mat for a lower surface.

FIG. 1 shows an example of a portion of a vehicle body, generally referred to as a vehicle body 10 herein. The vehicle body 10 defines a trunk cavity 14. The trunk cavity 14 is sized to receive a spare tire. The spare tire may be mounted within the trunk cavity 14. For example, the trunk cavity 14 may include a depression to receive the spare tire so that an upper portion of the spare tire is below or flush with a lower surface of the trunk cavity 14. A mat 30 may be sized for insertion within the trunk cavity 14 to substantially cover the lower surface of the trunk cavity 14.

Figure 2:
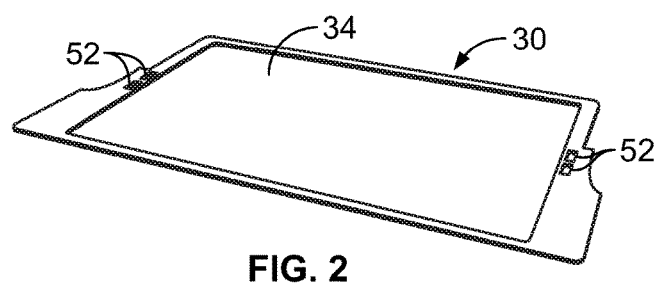
FIG. 2 is a perspective view of an example of a first side of the mat of FIG. 1.
Figure 3:
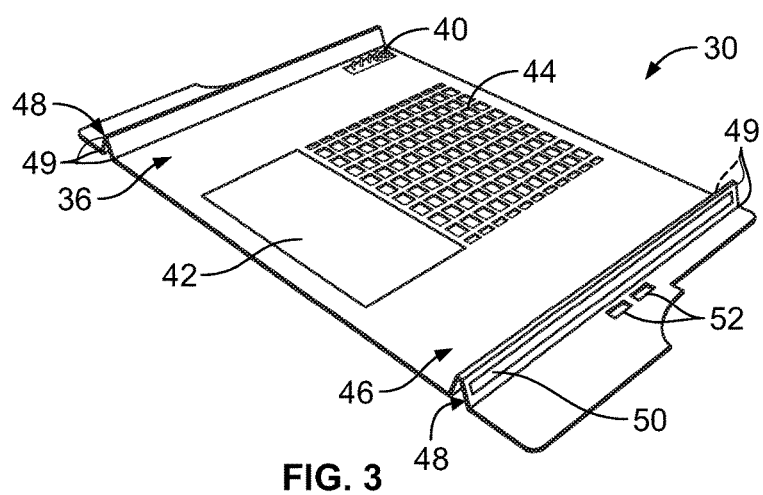
FIG. 3 is a perspective view of an example of a second side of the mat of FIG. 1.

FIGS. 2 and 3 show further detail of the mat 30. The mat 30 includes a first side 34 as shown in FIG. 2 and a second side 36 as shown in FIG. 3. The mat 30 includes features to assist a user in replacing a failed tire. The first side 34 faces upward when positioned within a trunk cavity to conceal, for example, a spare tire. The first side 34 may be of a material to assist in repelling debris or dust collected thereupon. For example, the first side 34 may be a super-hydrophobic surface including a non-silica coating for easy cleaning. When a user is changing a failed tire, the mat 30 may be positioned adjacent a vehicle tire mount location with the second side 36 facing upward (shown in FIG. 5). The second side 36 may include features to assist the user in removing and replacing the failed tire. For example, the second side 36 may include a receptacle 40, a first surface 42, a second surface 44, indicia 46, one or more foldable portions 48, and a reflector 50. The mat 30 may include one or more handle apertures 52 to assist a user in gripping and moving the mat 30. For example, the one or more handle apertures 52 may be located adjacent edges of the mat 30.

The receptacle 40 may be sized to receive fasteners, such as wheel nuts. The first surface 42 may be of a relatively soft material to provide a soft surface for a user to, for example, kneel upon. The second surface 44 may be of an anti-slip material for the user to, for example, position a foot or knee upon. The second surface 44 may be comprised of portions extending above or below the second surface 44 to define raised and lowered portions to assist in creating an anti-slip feature.

The indicia 46 may include instructions to assist the user with removal and replacement of the failed tire. For example, the indicia 46 may include step-by-step directions on tire removal and replacement. The one or more foldable portions 48 may be located adjacent ends of the mat 30. One or more foldable seams 49 may be located upon the mat 30 to further define the foldable portions 48. Each of the foldable portions 48 may have a first orientation and a second orientation. The reflector 50 may be mounted to one of the foldable portions 48 so that the reflector 50 is oriented substantially horizontal relative to an underlying surface when the foldable portion 48 is in the first orientation. The reflector 50 may be mounted to one of the foldable portions 48 so that the reflector 50 is oriented substantially upright relative to the underlying surface when the foldable portion 48 is in the second orientation (as shown in FIG. 3). For example, when oriented substantially upright, the reflector 50 is visible to motorists or others when passing. The mat 30 may have various shapes for insertion with a respective trunk cavity.

Figure 4A:
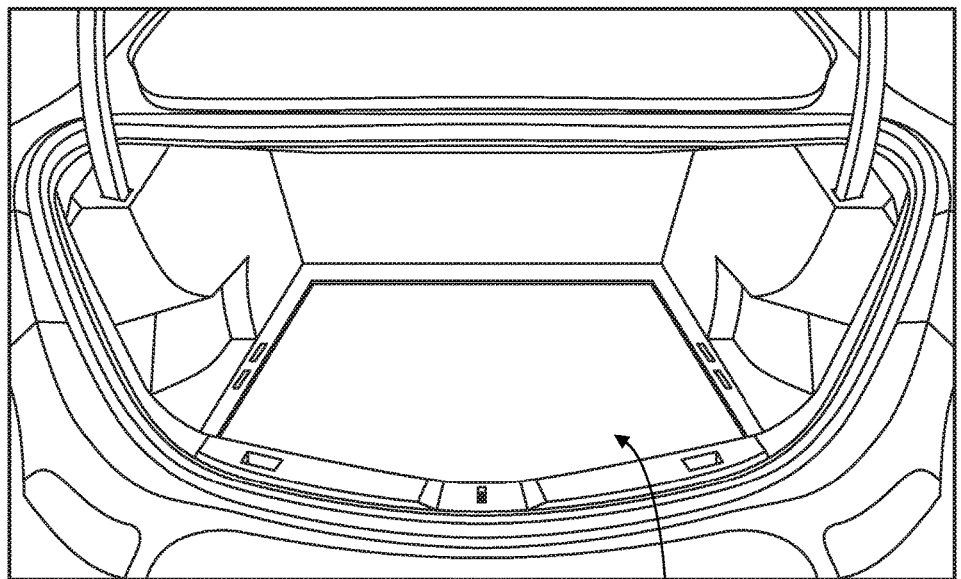
FIG. 4A is a fragmentary rear perspective view of a portion of an example of a vehicle trunk cavity including an example of a mat for a lower surface.
Figure 4B:
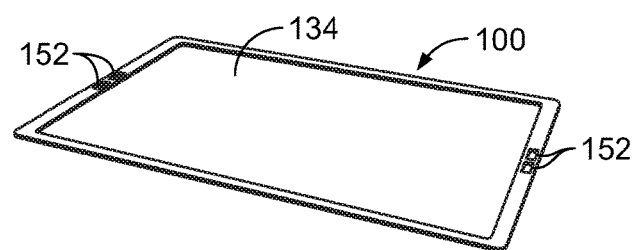
FIG. 4B is a perspective view of an example of a first side of the mat of FIG. 4A.
Figure 4C:
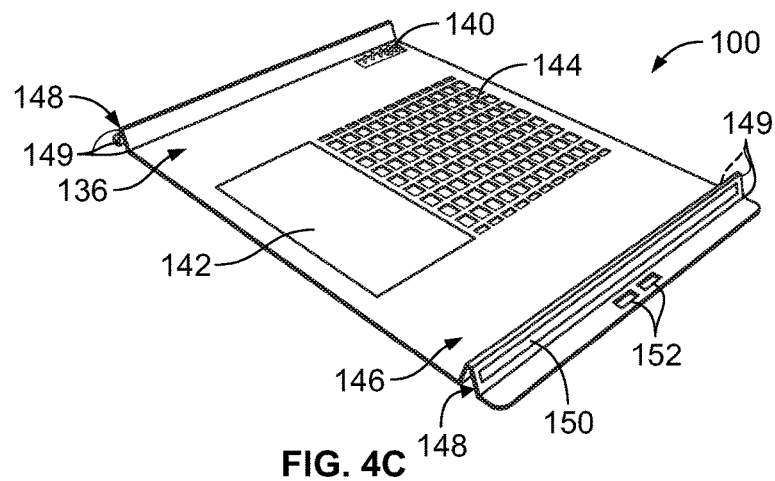
FIG. 4C is a perspective view of an example of a second side of the mat of FIG. 4A.
Figure 5:
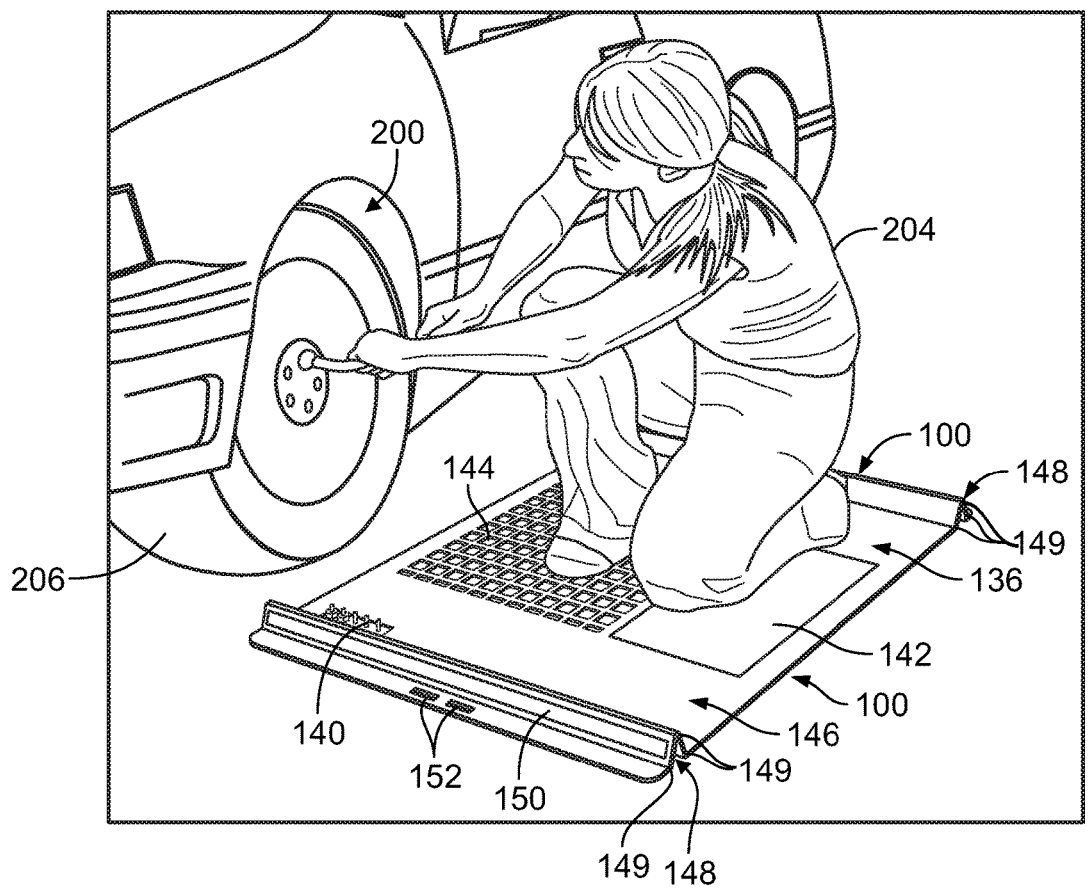
FIG. 5 is a fragmentary front perspective view of an example of a vehicle tire mount location, a user, and the mat of FIG. 4A.

FIGS. 4A through 4C show another example of a shape for a trunk mat. Trunk mat 100 has a substantially rectangular shape to cover a portion of a lower surface of a vehicle trunk cavity. The trunk mat 100 includes features to assist a user in replacing a failed tire similar to the features described above for the mat 30. For example, the trunk mat 100 includes a first side 134 as shown in FIG. 4B and a second side 136 as shown in FIG. 4C. The trunk mat 100 includes features to assist a user in replacing a failed tire. The first side 134 faces upward when positioned within a trunk cavity to conceal, for example, a spare tire. The first side 134 may be of a material to assist in repelling debris or dust collected thereupon. For example, the first side 134 may be a super-hydrophobic surface including a non-silica coating for easy cleaning. When a user is changing a failed tire, the trunk mat 100 may be positioned adjacent a vehicle tire mount location with the second side 136 facing upward relative to an underlying surface as shown in FIG. 5.

The second side 136 may include features to assist the user in removing and replacing the failed tire. For example, the second side 136 may include a receptacle 140, a first surface 142, a second surface 144, indicia 146, one or more foldable portions 148, and a reflector 150. The trunk mat 100 may include one or more handle apertures 152 to assist a user in gripping and moving the trunk mat 100. For example, the one or more handle apertures 152 may be located adjacent edges of the trunk mat 100.

The receptacle 140 may be sized to receive fasteners, such as wheel nuts. The first surface 142 may be of a relatively soft material to provide a soft surface for a user to, for example, kneel upon. The second surface 144 may be of an anti-slip material for the user to, for example, position a foot or knee upon. The second surface 144 may be comprised of portions extending from the second surface 144 to define raised and lowered portions to assist in creating an anti-slip feature.

The indicia 146 may include instructions to assist the user with removal and replacement of the failed tire. For example, the indicia 146 may include step-by-step directions on tire removal and replacement. The one or more foldable portions 148 may be located adjacent ends of the trunk mat 100. One or more foldable seams 149 may be located upon the trunk mat 100 to further define the foldable portions 148. Each of the foldable portions 148 may have a first orientation and a second orientation. The reflector 150 may be mounted to one of the foldable portions 148 so that the reflector 150 is oriented substantially horizontal relative to an underlying surface when the foldable portion 148 is in the first orientation. The reflector 150 may be mounted to one of the foldable portions 148 so that the reflector 150 is oriented substantially upright relative to the underlying surface when the foldable portion 148 is in the second orientation. For example, when oriented substantially upright, the reflector 150 is visible to motorists or others when passing. The trunk mat 100 may have various shapes for insertion with a respective trunk cavity.

FIG. 5 shows a fragmentary perspective view of an example of a vehicle tire mount location 200, a user 204, and the trunk mat 100. The trunk mat 100 is shown positioned adjacent the vehicle tire mount location 200. With the second side 136 facing upward to the underlying surface, the user 204 may utilize the features of the trunk mat 100 to assist in replacement of a failed tire 206. For example, each of the foldable portions 148 is shown in the second orientation so that the reflector 150 is oriented substantially upright and visible by motorists or other passing. A knee of the user 204 rests upon the first surface 142 so that the soft material of the first surface provides comfort to the user 204. A foot of the user 204 rests upon the second surface 144 to take advantage of the anti-slip characteristics. Wheel nuts of the failed tire 206 may be positioned within the receptacle 140 to prevent loss.

While various embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle trunk mat comprising:
a first side; and
a second side including a receptacle, at least two surfaces, and a foldable portion including a reflector,
wherein the sides are shaped to substantially cover a trunk lower surface with the first side for facing upward when positioned upon the trunk lower surface and the second side for facing upward relative to an underlying surface when positioned adjacent a vehicle tire mount location.

2. The vehicle trunk mat of claim 1, wherein the receptacle is sized to receive one or more wheel nuts.

3. The vehicle trunk mat of claim 1, wherein the foldable portion orients the reflector in a substantially horizontal orientation relative to the underlying surface when positioned in a first position and orients the reflector in a substantially upright orientation relative to the underlying surface when positioned in a second position.

4. The vehicle trunk mat of claim 1, wherein the at least two surfaces comprise an anti-slip surface and a soft surface.

5. The vehicle trunk mat of claim 1, wherein the first side is of a material selected to minimize debris accumulation thereupon when the second side is facing upward.

6. The vehicle trunk mat of claim 1, wherein the first and second sides define at least one handle aperture.

7. A vehicle trunk assembly comprising:
a vehicle body including a trunk cavity defining a lower surface; and
a trunk mat sized to substantially cover the lower surface and including a first side of a material selected to minimize debris adhesion and a second side having features to assist a user in replacing a failed tire including a first surface having soft characteristics to support a user thereupon and a foldable portion including a reflector.

8. The assembly of claim 7, wherein the features of the second side further include a receptacle to retain one or more wheel fasteners.

9. The assembly of claim 8, wherein the second side further includes a second surface including an anti-slip material.

10. The assembly of claim 7, wherein the first side is a super-hydrophobic surface including a non-silica coating.

11. The assembly of claim 7, wherein the second side further includes an anti-slip surface having portions extending above or below the anti-slip surface to define raised and lowered portions.

12. The assembly of claim 7, wherein the second side further has indicia including instructions on failed tire replacement.

13. The assembly of claim 7, wherein the trunk mat further comprises at least one foldable seam so that the foldable portion of the trunk mat may fold upward to orient the reflector in a substantially upright position relative to an underlying surface.

14. A vehicle trunk mat comprising:
a first side; and
a second side opposite the first side and including a first surface having anti-slip characteristics and a second surface having user-supporting soft characteristics,
wherein the vehicle trunk mat is shaped to cover a portion of a trunk cavity lower surface with the first side facing upward and sized for location upon a surface adjacent a tire mount location to assist in replacing a failed tire.

15. The vehicle trunk mat of claim 14, wherein the second side further includes indicia having tire change instructions thereupon.

16. The vehicle trunk mat of claim 14, wherein the second side further includes a reflector.

17. The vehicle trunk mat of claim 16 further comprising a foldable portion in which an upright configuration positions the reflector upright relative to an underlying surface.

18. The vehicle trunk mat of claim 14, wherein the second side further includes a receptacle sized to receive one or more wheel nuts.

19. The vehicle trunk mat of claim 14, wherein the first side is of a material to minimize debris adhesion thereto.

* * * * *